(12) United States Patent
Shin et al.

(10) Patent No.: US 11,784,002 B2
(45) Date of Patent: *Oct. 10, 2023

(54) CERAMIC ELECTRONIC COMPONENT

(71) Applicant: SAMSUNG ELECTRO-MECHANICS CO., LTD., Suwon-si (KR)

(72) Inventors: Dong Hwi Shin, Suwon-si (KR); Dong Yeong Kim, Suwon-si (KR); Do Yeon Kim, Suwon-si (KR); Woo Chul Shin, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/389,813

(22) Filed: Jul. 30, 2021

(65) Prior Publication Data
US 2021/0358692 A1 Nov. 18, 2021

Related U.S. Application Data

(63) Continuation of application No. 16/195,181, filed on Nov. 19, 2018, now Pat. No. 11,101,074.

(30) Foreign Application Priority Data

Sep. 21, 2018 (KR) .................. 10-2018-0114260

(51) Int. Cl.
*H01G 4/232* (2006.01)
*H01G 4/30* (2006.01)
(Continued)

(52) U.S. Cl.
CPC .......... *H01G 4/2325* (2013.01); *H01G 4/012* (2013.01); *H01G 4/248* (2013.01); *H01G 4/30* (2013.01); *H01G 4/1227* (2013.01)

(58) Field of Classification Search
CPC ...... H01G 4/232; H01G 4/2325; H01G 4/248; H01G 4/30; H01G 4/1227; H01G 4/012
(Continued)

(56) References Cited

U.S. PATENT DOCUMENTS

| 2006/0028785 A1 | 2/2006 | Togashi et al. |
| 2010/0091429 A1* | 4/2010 | Koga ................ H01G 4/30 361/321.2 |

(Continued)

FOREIGN PATENT DOCUMENTS

| CN | 105931839 | 9/2016 |
| CN | 106024380 A | 10/2016 |

(Continued)

OTHER PUBLICATIONS

Final Office Action issued in corresponding U.S. Appl. No. 16/195,181 dated Dec. 9, 2020.
(Continued)

*Primary Examiner* — Arun Ramaswamy
(74) *Attorney, Agent, or Firm* — Morgan, Lewis & Bockius LLP

(57) ABSTRACT

A ceramic electronic component includes a body including dielectric layers and a plurality of internal electrodes and an external electrode including a connection portion and a band portion. The external electrode includes an electrode layer, a conductive resin layer, a nickel plating layer, and a tin plating layer. When an electrode layer thickness, a conductive resin layer thickness, a nickel plating layer thickness, a tin plating layer thickness of the band portion are defined as t3, t4, and t5, respectively, t5 is greater than or equal to 0.5 micrometer and less than 7 micrometer, and t5/(t3+t4) satisfies 1≤t5/(t3+t4)*100<17.5 in the case in which t3+t4 is
(Continued)

less than or equal to 100 micrometers and satisfies $0.3 \leq t5/(t3+t4)*100 < 4.38$ in the case in which $t3+t4$ is more than 100 micrometers.

15 Claims, 5 Drawing Sheets

(51) Int. Cl.
  *H01G 4/012* (2006.01)
  *H01G 4/248* (2006.01)
  *H01G 4/12* (2006.01)
(58) Field of Classification Search
  USPC ......... 361/301.4, 321.1, 321.2, 321.3, 306.1, 361/306.3
  See application file for complete search history.

(56) References Cited

U.S. PATENT DOCUMENTS

| | | | |
|---|---|---|---|
| 2011/0266040 A1* | 11/2011 | Kim ................. | H05K 1/185 361/306.3 |
| 2013/0242457 A1 | 9/2013 | Lee et al. | |
| 2015/0243438 A1 | 8/2015 | Ahn et al. | |
| 2016/0093442 A1 | 3/2016 | Nagamoto | |
| 2016/0141103 A1* | 5/2016 | Hamanaka ............ | H01G 4/232 361/301.4 |
| 2016/0254094 A1 | 9/2016 | Lee et al. | |
| 2016/0284471 A1 | 9/2016 | Mizuno | |
| 2017/0018361 A1* | 1/2017 | Nishisaka ............ | H01G 4/2325 |
| 2017/0127521 A1* | 5/2017 | You ..................... | H01G 2/06 |
| 2017/0178811 A1 | 6/2017 | Chun et al. | |
| 2017/0301464 A1* | 10/2017 | Terashita ............ | H01G 4/12 |
| 2018/0114644 A1* | 4/2018 | Sugita ................. | H01G 4/12 |
| 2018/0151296 A1 | 5/2018 | Yamada | |

FOREIGN PATENT DOCUMENTS

| | | |
|---|---|---|
| CN | 106910631 A | 6/2017 |
| CN | 108288543 A | 7/2018 |
| JP | 2014-220324 A | 11/2014 |
| JP | 2014-241453 A | 12/2014 |
| KR | 10-2015-0101920 A | 9/2015 |
| KR | 10-2017-0074470 A | 6/2017 |

OTHER PUBLICATIONS

Non-Final Office Action issued in corresponding U.S. Appl. No. 16/195,181 dated Jun. 19, 2020.
Notice of Allowance issued in corresponding U.S. Appl. No. 16/195,181 dated Apr. 23, 2021.
First Office Action issued in Chinese Patent Application No. 201910128559.5, dated Mar. 3, 2021, with English translation.
Office Action issued in Korean Patent Application No. 10-2018-0114260 dated Aug. 13, 2019, with English translation.
Office Action issued in corresponding Chinese Patent Application No. 201910128559.5 dated Aug. 10, 2021, with English translation.

* cited by examiner

CERAMIC ELECTRONIC COMPONENT

CROSS-REFERENCE TO RELATED APPLICATION(S)

This application is the continuation application of U.S. patent application Ser. No. 16/195,181 filed on Nov. 19, 2018, which claims the benefit of priority to Korean Patent Application No. 10-2018-0114260 filed on Sep. 21, 2018 in the Korean Intellectual Property Office, the disclosures of which are incorporated herein by reference in their entirety.

BACKGROUND

1. Field

The present disclosure relates to a ceramic electronic component.

2. Description of Related Art

A multilayer ceramic capacitor, which is a type of ceramic electronic component, is mounted on printed circuit boards of various electronic products, including display devices such as a liquid crystal display (LCD), a plasma display panel (PDP), and the like, computers, smartphones, mobile phones, and the like, serving to charge or discharge electricity.

Such a multilayer ceramic capacitor may be used as a component of various types of electronic devices, due to advantages thereof such as compactness, high capacitance, and ease of mounting. Due to the trend for small-sized and high-power electronic devices such as computers, mobile devices, and the like, there is an increasing need for small-sized, high-capacitance multilayer ceramic capacitors.

Recently, as industrial interest in electric components is increasing, multilayer ceramic capacitors are being required to have high-reliability and high-strength characteristics to be used in automobile or infotainment systems.

In detail, multilayer ceramic capacitors have been required to have high flexural strength characteristics.

Accordingly, it is necessary to improve internal and external structures.

SUMMARY

An aspect of the present disclosure may provide a ceramic electronic component having excellent reliability.

According to an aspect of the present disclosure, a ceramic electronic component includes a body including dielectric layers and a plurality of internal electrodes disposed to face each other with the dielectric layers interposed therebetween, the body having first and second surfaces disposed to oppose each other, third and fourth surfaces connected to the first and second surfaces and disposed to oppose each other, and fifth and sixth surfaces connected to the first to fourth surfaces and disposed to oppose each other, and an external electrode including a connection portion disposed on the third or fourth surface of the body and a band portion extending from the connection portion to portions of the first and second surfaces. The external electrode includes an electrode layer connected to the internal electrode, a conductive resin layer disposed on the electrode layer, a nickel (Ni) plating layer disposed on the conductive resin layer, and a tin (Sn) plating layer disposed on the Ni plating layer. The Ni plating layer extends beyond the conductive resin layer, and the Sn plating layer extends beyond the Ni plating layer. When $t1$ is an extent of the Ni plating layer in direct contact with the body in the band portion and $t2$ is an extent of the Sn plating layer in direct contact with the body in the band portion, $t1$ is greater than or equal to 0.5 micrometer and less than 7 micrometers, while $t1/t2$ satisfies $0 < t1/t2 < 0.7$ or $1.0 \leq t1/t2 < 7.0$.

According to an aspect of the present disclosure, a ceramic electronic component includes a body including dielectric layers and a plurality of internal electrodes disposed to face each other with the dielectric layers interposed therebetween, the body having first and second surfaces disposed to oppose each other, third and fourth surfaces disposed to oppose each other, and fifth and sixth surfaces disposed to oppose each other, and an external electrode including a connection portion disposed on the third or fourth surface of the body and a band portion extending from the connection portion to portions of the first and second surfaces. The external electrode includes an electrode layer connected to the internal electrode, a conductive resin layer disposed on the electrode layer, a nickel (Ni) plating layer disposed on the conductive resin layer, and a tin (Sn) plating layer disposed on the Ni plating layer. When an electrode layer thickness of the band portion is defined as $t3$, a conductive resin layer thickness of the band portion is defined as $t4$, a nickel (Ni) plating layer thickness of the band portion is defined as $t5$, and a tin (Sn) plating layer of the band portion is defined as $t6$, $t5$ is greater than or equal to 0.5 micrometer and less than 7 micrometers, and $t5/(t3+t4)$ satisfies $1 \leq t5/(t3+t4)*100 < 17.5$ in the case in which $t3+t4$ is less than or equal to 100 micrometers and satisfies $0.3 \leq t5/(t3+t4)*100 < 4.38$ in the case in which $t3+t4$ is more than 100 micrometers.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
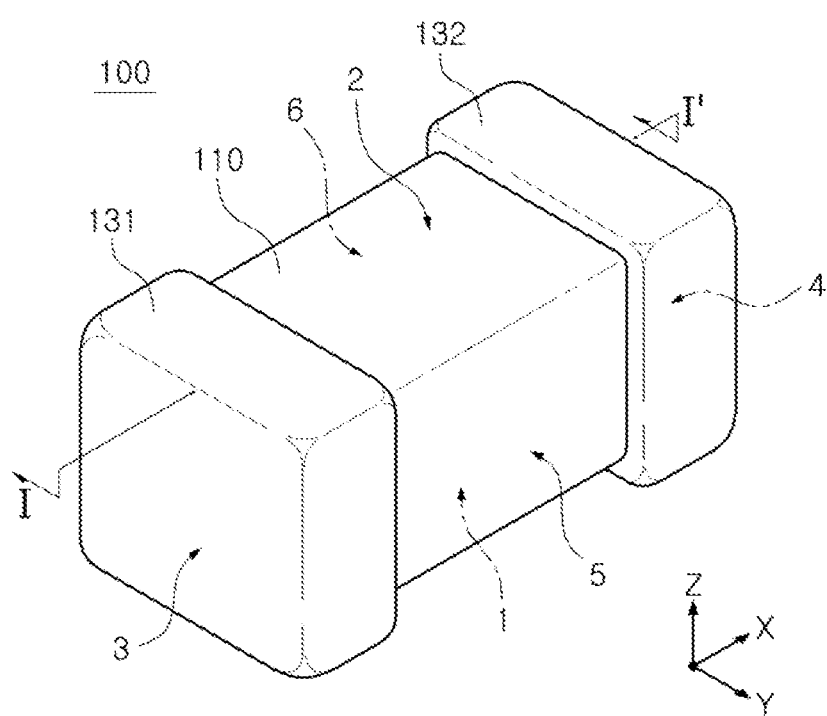
FIG. 1 is a perspective view of a ceramic electronic component according to an exemplary embodiment in the present disclosure.

Hereinafter, embodiments in the present disclosure will be described as follows with reference to the attached drawings. The present disclosure may, however, be embodied in many different forms and should not be construed as being limited to the embodiments set forth herein. Rather, these embodiments are provided so that this disclosure will be thorough and complete, and will fully convey the scope of the present disclosure to those skilled in the art. In the drawings, the shapes and dimensions of elements may be exaggerated for clarity, and the same reference numerals will be used throughout to designate the same or like components.

Also, elements having the same function within a scope of the same concept illustrated in drawings of respective embodiments will be described by using the same reference numerals. Terms used in the present specification are for explaining the embodiments rather than limiting the present invention. Unless explicitly described to the contrary, a singular form includes a plural form in the present specification. The word "comprise" and variations such as "comprises" or "comprising," will be understood to imply the inclusion of stated constituents, steps, operations and/or elements but not the exclusion of any other constituents, steps, operations and/or elements.

In drawings, an X direction may be defined as a second direction, an L direction or a length direction, a Y direction may be defined as a third direction, a W direction or a width direction, and a Z direction may be defined as a first direction or a laminated direction, a T direction or a thickness direction.

Ceramic Electronic Component

FIG. 1 is a perspective view of a ceramic electronic component according to an exemplary embodiment in the present disclosure.

Figure 2:
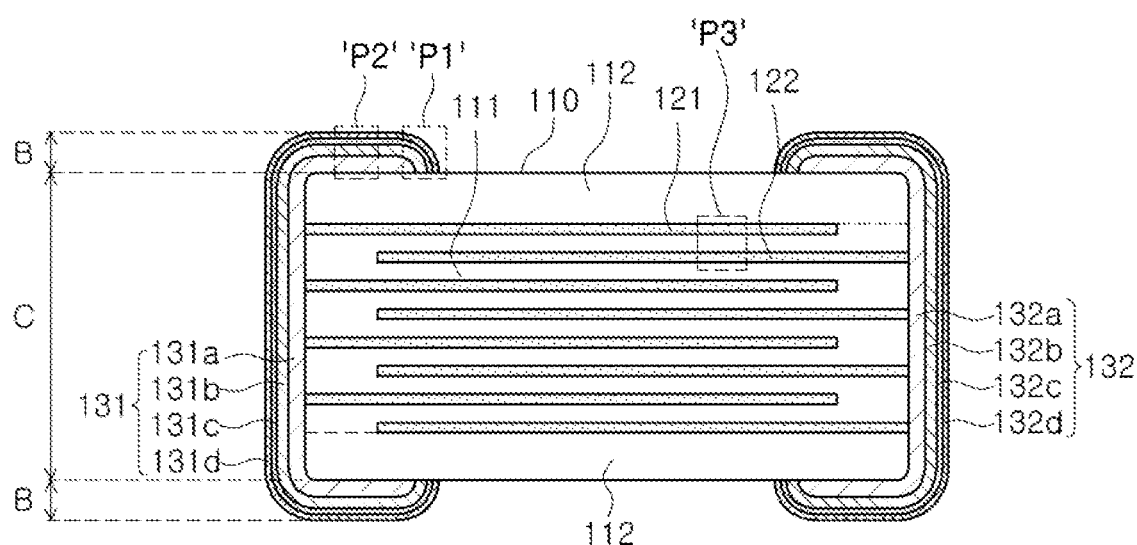
FIG. 2 is a cross-sectional view taken along line I-I' in FIG. 1.

FIG. 2 is a cross-sectional view taken along line I-I' in FIG. 1.

Figure 3A:
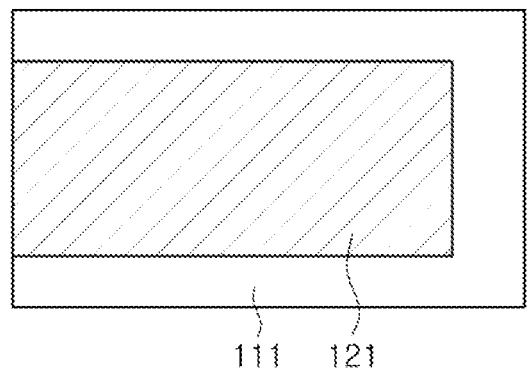
FIG. 3A illustrates a ceramic green sheet on which a first internal electrode is printed.
Figure 3B:
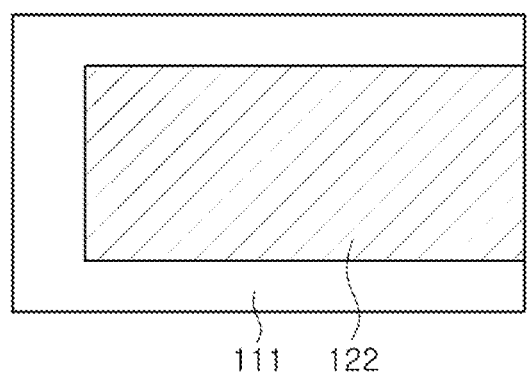
FIG. 3B illustrates a ceramic green sheet on which a second internal electrode is printed.

FIG. 3A illustrates a ceramic green sheet on which a first internal electrode is printed, and FIG. 3B illustrates a ceramic green sheet on which a second internal electrode is printed.

Referring to FIGS. 1 to 3B, a capacitor component 100 according to an exemplary embodiment includes a body 110 and external electrodes 131 and 132. The body 110 includes a plurality of dielectric layers 111 and first and second internal electrodes 121 and 122 alternately disposed to face each other with the dielectric layers 111 interposed therebetween, and has first and second surfaces 1 and 2 disposed to oppose each other, third and fourth surfaces 3 and 4 connected to the first and second surfaces 1 and 2 and disposed to oppose each other, and fifth and sixth surfaces 5 and 6 connected to the first to fourth surfaces 1 to 4 and disposed to oppose each other. The external electrodes 131 and 132 include connection portions C disposed on the third surface 3 and the fourth surface 4 of the body 110 and band portions B extending from the connection portion C to portions of the first and second surfaces 1 and 2. The external electrodes 131 and 132 include electrode layers 131a and 132a connected to the internal electrodes 121 and 122, conductive resin layers 131b and 132b disposed on the electrodes 131a and 132a, nickel (Ni) plating layers 131c and 132c disposed on the conductive resin layers 131b and 132b, and tin (Sn) plating layers 131d and 132d disposed on the conductive resin layers 131b and 132b. When an extent of the Ni plating layer 131c or 132c in direct contact with the body 110 in the band portion B is defined as t1 and an extent of the Sn plating layer 131d or 132d in direct contact with the body 110 in the band portion B is defined as t2, t1 is greater than or equal to 0.5 micrometer (μm) and less than 7 μm, while t1/t2 satisfies 0<t1/t2<0.7 or 1.0≤t1/t2<7.0.

Hereinafter, a ceramic electronic component according to an exemplary embodiment will be described. In detail, a multilayer ceramic capacitor will be described but the description will not be limited thereto.

In the body 110, the dielectric layers 111 and the internal electrodes 121 and 122 are alternately laminated.

The body 110 is not limited in shape, but may have a hexahedral shape or a shape similar thereto. During shrinkage of a ceramic powder included in the body 110 during sintering, the body 110 may have a substantially hexahedral shape rather than a hexahedral shape having complete straight lines.

The body 110 may have first and second surfaces 1 and 2 disposed to oppose each other in a thickness direction (Z direction), third and fourth surfaces 3 and 4 connected to the first and second surfaces 1 and 2 and disposed to oppose each other in a length direction (X direction), and fifth and sixth surfaces connected to the first and second surfaces 1 and 2 as well as the third and fourth surfaces 3 and 4 and disposed to oppose each other in a width direction (Y direction).

The plurality of dielectric layers 111 constituting the body 110 is sintered, and may be integrated with each other such that boundaries therebetween may not be readily apparent without using a scanning electron microscope (SEM).

According to an exemplary embodiment, a material of the dielectric layers 111 is not limited as long as sufficient capacitance can be obtained. For example, the material of the dielectric layers 111 may a barium titanate-based material, a lead composite perovskite-based material, a strontium titanate-based material or the like.

According to purposes of the present disclosure, a ceramic additive, an organic solvent, a plasticizer, a binder, a dispersant, and the like may be added to a powder such as barium titanate ($BaTiO_3$) which is a material of the dielectric material 111.

The plurality of internal electrodes 121 and 122 may be disposed to face each other with the dielectric layer 111 interposed therebetween.

The first and second may be exposed to the third and fourth surfaces 3 and 4 of the body 110, respectively.

Referring to FIGS. 1 and 2, the first internal electrode 121 may be spaced apart from the fourth surface 4 and exposed through the third surface 3, and the second internal electrode 122 may be spaced apart from the third surface 3 and exposed through the fourth surface 4. The first external electrode 131 may be disposed on the third surface 3 of the body 110 to be connected to the first internal electrode 121, and the second external electrode 132 may be disposed on the fourth surface 4 of the body 110 to be connected to the second internal electrode 122.

The first and second internal electrodes 121 and 122 may be electrically separated from each other by the dielectric layer 111 interposed therebetween. Referring to FIGS. 3A and 3B, the body 110 may be formed by alternately laminating a ceramic green sheet 'a' on which the first internal electrode 121 is printed and a ceramic green sheet 'b' on which the second internal electrode 122 is printed, in a thickness direction (Z direction) and sintering the laminated ceramic green sheets 'a' and 'b'.

A material of the first and second internal electrodes 121 and 122 is not limited. For example, the first and second internal electrodes 121 and 122 may be formed using a conductive paste including at least one of a noble metal such as palladium (Pd), a palladium-silver (Pd—Ag) alloy, nickel (Ni), and copper (Cu).

A printing method of the conductive paste may be a screen printing method, a gravure printing method or the like, but is not limited thereto.

The capacitor component 100 according to another exemplary embodiment may include a capacitance forming portion and cover portions 112. The capacitance forming portion is disposed inside the body 110, and includes a first internal electrode 121 and a second internal electrode 122 disposed to face each other with the dielectric layer 111 interposed therebetween in such a manner that capacitance is formed. The cover portions 112 are disposed above and below the capacitance forming portion.

The cover portions 112 do not include internal electrodes 121 and 122, and may include the same material as the dielectric layer 111. For example, the cover portions 112 may include a ceramic material such as a barium titanate-based material, a lead composite perovskite-based material, a strontium titanate-based material, or the like.

The cover portions 112 may be formed by vertically laminating a single dielectric layer or two or more dielectric layers on top and bottom surfaces of the capacitance forming portion, respectively. The cover portions 112 may basically serve to prevent an internal electrode from being damaged by a physical or chemical stress.

The capacitor component 100 according to another exemplary embodiment includes external electrodes 131 and 132 including a connection portion C disposed on a third surface or a fourth surface 4 of a body 110 and band portions B extending from the connection portion C to portions of the first and second surfaces 1 and 2.

The band portions B may extend from the connection portion C to portions of the first and second surfaces 1 and 2 as well as portions of fifth and sixth surfaces 5 and 6.

The external electrodes 131 and 132 may include a first external electrode 131 including a connection portion disposed on the third surface 3 and a second external electrode 132 including a connection portion disposed on the fourth surface 4.

The first and second external electrodes 131 and 132 may be electrically connected to the first and second internal electrodes 121 and 122 to form capacitance, respectively. The second external electrode 132 may be connected to a potential different from a potential connected to the first external electrode 131.

Hereinafter, the first external electrode 131 will be mainly described, but the description will be similarly applied to the second electrode 132.

The external electrodes 131 and 132 include electrode layers 131a and 132a connected to the internal electrodes 121 and 122, conductive resin layers 131b and 132b disposed on the electrode layers 131a and 132a, nickel (Ni) plating layers 131c and 132c disposed on the conductive resin layers 131b and 132b, and tin (Sn) plating layers 131d and 132d disposed on the Ni plating layers 131c and 132c.

The electrode layers 131a and 132a may include a conductive metal and a glass.

The conductive metal for use in the electrode layers 131a and 132a is not limited as long as it may be electrically connected to the internal electrode to form capacitance. For example, the conductive metal may be at least one selected from the group consisting of copper (Cu), silver (Ag), nickel (Ni), and alloys thereof.

The electrode layers 131a and 132a may be formed by coating a conductive paste prepared by adding a glass frit to the conductive metal powder and sintering the conductive paste.

The conductive resin layers 131b and 132b may be disposed on the electrode layers 131a and 132a to fully cover the electrode layers 131a and 132a.

The conductive resin layers 131b and 132b may include a conductive metal and a base resin.

The base resin included in the conductive resin layers 131b and 132b is not limited as long as it may have bonding and shock absorption and may be mixed with a conductive metal powder to prepare a paste. For example, the base resin may include an epoxy-based resin.

The conductive metal included in the conductive resin layers 131b and 132b is not limited as long as it may be electrically connected to the electrode layers 131a and 132a.

For example, the conductive metal may include at least one selected from the group consisting of copper (Cu), silver (Ag), nickel (Ni), and alloys thereof.

The Ni plating layers 131c and 132c may be disposed on the conductive resin layers 131b and 132b to fully cover the conductive resin layers 131b and 132b.

The Sn plating layers 131d and 132d may be disposed on the Ni plating layers 131c and 132c to fully cover the Ni plating layers 131c and 132c.

The Sn plating layers 131d and 132d may serve to improve mounting characteristics.

Figure 4:
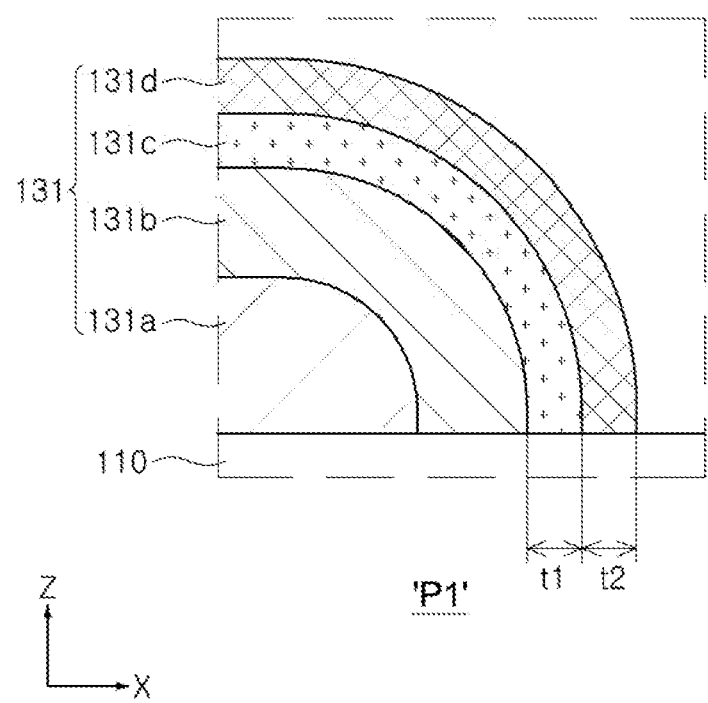
FIG. 4 is an enlarged view of region 'P1' in FIG. 2.

FIG. 4 is an enlarged view of region 'P1' in FIG. 2.

Referring to FIG. 4, in a ceramic electronic component according to an exemplary embodiment, when an extent t1 of a Ni plating layer 131c in direct contact with the body 110 in the band portion B is defined as t1 and an extent of an Sn plating layer 131d in direct contact with the body 110 in the band portion B is defined as t2, t1 may be greater than or equal to 0.5 micrometer (μm) and less than 7 μm and t1/t2 may satisfy 0<t1/t2<0.7 or 1.0≤t1/t2<7.0.

When the extent t1 of the Ni plating layer 131c in direct contact with the body 110 in the band portion B is less than 0.5 μm, it may be difficult to secure solderability. When the extent t1 is more than 7 μm, a frequency of occurrence of flexural cracking caused by plating stress may be increased to degrade flexural strength characteristics.

When the extent t1 of the Ni plating layer in direct contact with the body 110 in the band portion B is less than the extent t2 of the Sn plating layer 131d in direct contact with the body 110 on the end of the band portion B, t1/t2 should be less than 0.7 to secure sufficient flexural strength. When the extent t1 of the Ni plating layer 131c in direct contact with the body 110 in the band portion B is greater than or equal to the extent t2 of the Sn plating layer in direct contact with the body 110 in the band portion B, t1/t2 should be less than 7 to secure sufficient flexural strength. For example, t1/t2 should satisfy 0<t1/t2<0.7 or 1.0≤t1/t2<7.0 to secure sufficient flexural strength.

As t1 is greater than or equal to 0.7 μm and less than 7 μm while t1/t2 satisfies 0<t1/t2<0.7 or 1.0≤t1/t2<7.0, sufficient flexural strength of 5 mm or more may be secured.

In this case, the extent t2 of the Sn plating layer 131d in direct contact with the body 110 in the band portion B is greater than or equal to 0.5 μm and less than 12 μm.

When the extent t2 of the Sn plating layer 131d in direct contact with the body 110 in the band portion B is less than 0.5 μm, it may be difficult to secure solderability. When the extent t2 of the Sn plating layer 131d in direct contact with the body 110 on the end of the band portion B is more than 12 μm, a frequency of occurrence of flexural cracking caused by a plating stress may be increased to degrade flexural strength characteristics.

The Sn plating layers 131d and 132d may be disposed on the Ni plating layers 131c and 132c to fully cover the Ni plating layers 131c and 132c.

The Sn plating layers 131d and 132d serves to improve mounting characteristics.

Figure 6:
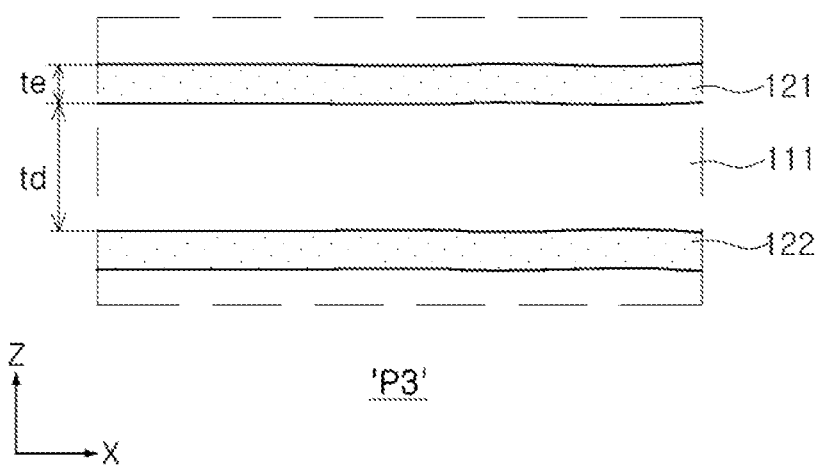
FIG. 6 is an enlarged view of region 'P3' in FIG. 2.

FIG. 6 is an enlarged view of region 'P3' in FIG. 2.

Referring to FIG. 6, in a capacitor component according to an exemplary embodiment, a thickness td of the dielectric layer 111 and a thickness te of each of the internal electrodes 121 and 122 may satisfy td>2*te.

For example, according to another exemplary embodiment, the thickness td of the dielectric layer 111 is twice greater than the thickness te of each of the internal electrodes 121 and 122.

Generally, an important issue of electronic components for high-voltage electric parts is reliability problem caused by breakdown voltage drop under a high-voltage environment.

In the capacitor component according to an exemplary embodiment, the dielectric layer 111 is provided to have the thickness td twice greater than the thickness te of each of the internal electrodes 121 and 122 to prevent a breakdown voltage from dropping under a high-voltage environment. Thus, a thickness of a dielectric layer that is a distance between internal electrodes may be increased to improve breakdown voltage characteristics.

In the case in which the thickness td of the dielectric layer 111 is at most twice greater than the thickness te of each of the internal electrodes 121 and 122, a thickness of a dielectric layer that is a distance between internal electrodes may be so small that a breakdown voltage drops.

The thickness te of each of the internal electrodes 121 and 122 may be less than 1 micrometer (μm) and the thickness td of the dielectric layer may be less than 2.8 μm, but the thicknesses thereof are not limited thereto.

Hereinafter, a capacitor component according to another exemplary embodiment will be described in detail.

To avoid duplicate explanations, descriptions to the same or similar elements as set forth in an exemplary embodiment will be omitted in another exemplary embodiment.

Similarly to the ceramic electronic component according to an exemplary embodiment, the ceramic electronic component according to another exemplary embodiment includes a body 110 and external electrodes 131 and 132. The body 110 includes a plurality of dielectric layers 111 and first and second internal electrodes 121 and 122 alternately disposed to face each other with the dielectric layers 111 interposed therebetween, and has first and second surfaces 1 and 2 disposed to oppose each other in the Z direction, third and fourth surfaces 3 and 4 connected to the first and second surfaces 1 and 2 and disposed to oppose each other in the X direction, and fifth and sixth surfaces 5 and 6 connected to the first to fourth surfaces 1 to 4 and disposed to oppose each other. The external electrodes 131 and 132 include a connection portion C disposed on the third surface 3 of the fourth surface 4 of the body 110 and band portions B extending from the connection portion C to portions of the first and second surfaces 1 and 2. The external electrode layers 131 and 132 may include electrode layers 131a and 132a, conductive resin layers 131b and 132b disposed on the electrode layers 131a and 132a, Nickel (Ni) plating layers 131c and 132c disposed on the conductive resin layers 131b and 132b, and tin (Sn) plating layers 131d and 132d disposed on the Ni plating layers 131c and 132c.

When a thickness of each of the electrode layers 131a and 132a of the band portion B is defined as t3, a thickness of each of the conductive resin layers 131b and 132b is defined as t4, a thickness of each of the Ni plating layers 131c and 132c is defined as t5, and a thickness of each of the Sn plating layers 131d and 132d is defined as t6, the t5 is greater than or equal to 0.5 μm and less than 7 μm. In the case in which t3+t4 is less than or equal to 100 μm, the t3 and t4 satisfy $1 \leq t5/(t3+t4)*100 < 17.5$. In the case in which t3+t4 is more than 100 μm, the t3 and t4 satisfy $0.3 \leq t5/(t3+t4)*100 < 4.38$.

In this case, t3 to t6 may be thicknesses measured in a central portion of the band portion B.

Hereinafter, the first external electrode 131 will be mainly described, but the description will be similarly applied to the second electrode 132.

Figure 5:
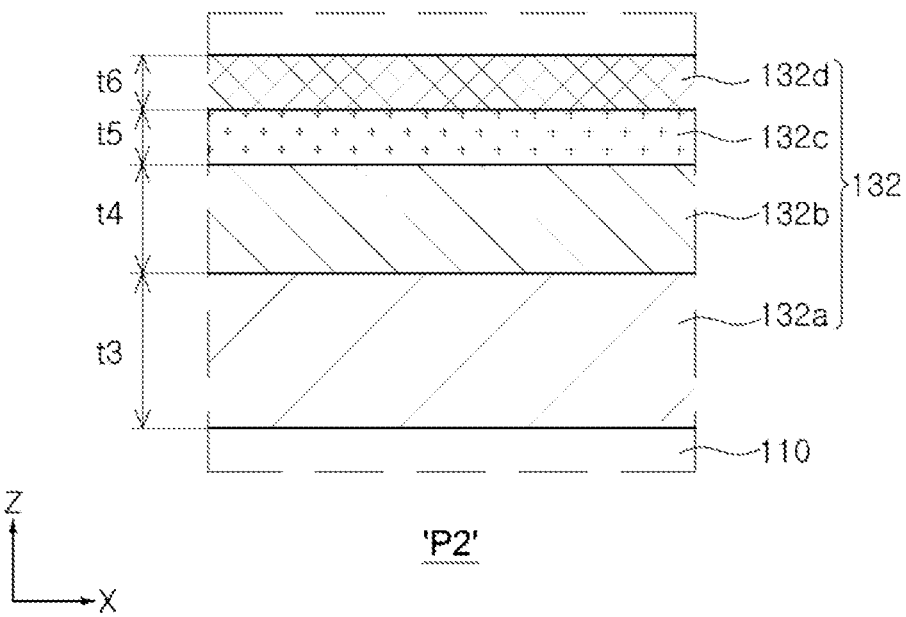
FIG. 5 is an enlarged view of region 'P2' in FIG. 2.

FIG. 5 is an enlarged view of region 'P2' in FIG. 2.

Referring to FIG. 5, a nickel (Ni) plating layer 132c of a band portion B has a thickness t5 greater than or equal to 0.5 μm and less than 7 μm.

When the thickness t5 of the Ni plating layer 132c is less than 0.5, it may be difficult to secure solderability.

When the thickness t5 of the Ni plating layer 132c is more than 7 μm, a frequency of occurrence of flexural cracking caused by a plating stress may be increased to degrade flexural strength characteristics.

Since sufficient flexural strength may not be secured only controlling the thickness t5 of the Ni plating layer 132c of the band portion B, the thickness t5 of the Ni plating layer 132c of the band portion B should be controlled considering the sum of a thickness t3 of the electrode layer 132a and a thickness t4 of the conductive resin layer 132b.

Accordingly, to secure sufficient flexural strength of 5 mm or more, t3+t4 should satisfy $1 \leq t5/(t3+t4)*100 < 17.5$ when t5 is greater than or equal to 0.5 μm and less than 7 μm and t3+t4 is less than or equal to 100 μm, and t3+t4 should satisfy $0.3 \leq t5/(t3+t4)*100 < 4.38$ when t5 is greater than or equal to 0.5 μm and less than 7 μm and t3+t4 is more than 100 μm.

In this case, the thickness t5 of the Ni plating layer 132c of the band portion B may be greater than or equal to 0.5 μm and less than 12 μm.

When the thickness t5 of the Ni plating layer 132c of the band portion B is less than 0.5 μm, it may be difficult to secure solderability. When the thickness t5 of the Ni plating layer 132c of the band portion B is more than 12 μm, a frequency of occurrence of flexural cracking caused by a plating stress may be increased to degrade flexural strength characteristics.

In Table (1), solderability and flexural strength depending on an extent t1 of a nickel (Ni) plating layer in direct contact with the body 110 in the band portion B and an extent t2 of a tin (Sn) plating layer in direct contact with the body 110 in the band portion B were evaluated and shown.

Regarding solderability, a mark 'o' refers to to a case in which external electrodes of samples of a multilayer ceramic capacitor were dipped into a solder and 95 area percent or more of the external electrodes was covered with the solder, and a mark 'X' refers to a case in which less than 95 area percent of the external electrodes was covered with the solder.

In the flexural strength, a mark 'o' refers to a case in which cracking did not occur, and a mark 'X' refers to a case in which cracking occurred. After the samples of the multilayer ceramic capacitor were mounted on a board, a distance from a central portion pressed during bending was set to be 5 mm to observe whether cracking occurred.

TABLE 1

| Sample No. | t1 (μm) | t2 (μm) | t1/t2 | Solderability | Flexural Strength |
|---|---|---|---|---|---|
| 1 | 1 | 1 | 1 | ○ | ○ |
| 2 | 1 | 3 | 0.3 | ○ | ○ |
| 3 | 1 | 5 | 0.2 | ○ | ○ |
| 4 | 1 | 7 | 0.1 | ○ | ○ |
| 5 | 1 | 10 | 0.1 | ○ | ○ |
| 6 | 3 | 1 | 3 | ○ | ○ |
| 7 | 3 | 3 | 1 | ○ | ○ |
| 8 | 3 | 5 | 0.6 | ○ | ○ |
| 9 | 3 | 7 | 0.4 | ○ | ○ |
| 10 | 3 | 10 | 0.3 | ○ | ○ |
| 11 | 5 | 1 | 5 | ○ | ○ |
| 12 | 5 | 3 | 1.7 | ○ | ○ |
| 13 | 5 | 5 | 1 | ○ | ○ |

TABLE 1-continued

| Sample No. | t1 (μm) | t2 (μm) | t1/t2 | Solderability | Flexural Strength |
|---|---|---|---|---|---|
| 14* | 5 | 7 | 0.7 | ○ | X |
| 15 | 5 | 10 | 0.5 | ○ | ○ |
| 16* | 7 | 1 | 7 | ○ | X |
| 17* | 7 | 3 | 2.3 | ○ | X |
| 18* | 7 | 5 | 1.4 | ○ | X |
| 19* | 7 | 7 | 1 | ○ | X |
| 20* | 7 | 10 | 0.7 | ○ | X |

*Comparative Example

Referring to Table (1), in samples No. 1 to 13 and 15, t1 was greater than or equal to 0.5 μm and less than 7 μm and t1/t2 satisfied 0<t1/t2<0.7 or 1.0≤t1/t2<7.0. Thus, solderability and flexural strength were excellent.

Meanwhile, in sample No. 14, t1 was greater than or equal to 0.5 μm and less than 7 μm and t1/t2 was 0.7. Since t1 satisfied the condition but t1/t2 did not satisfy the condition proposed in the present disclosure, the flexural strength was inferior.

In samples No. 16 and 20, t1 was 7 μm and t1/t2 was 0.7, which did not satisfy the condition proposed in the present disclosure. Thus, the flexural strength was inferior.

In samples No. 17 to 19, t1/t2 satisfied the condition proposed in the present disclosure, but t1 was as great as 7 μm. Thus, flexural strength was inferior.

In Table (2), solderability and flexural strength depending on a thickness t3 of an electrode layer of a band portion B, a thickness t4 of a conductive resin layer of the band portion B, a thickness t5 of a nickel (Ni) plating layer of the band portion B, and a thickness t6 of a tin (Sn) plating layer of the band portion B were evaluated and are shown.

The thicknesses t3 to t5 were measured in a central portion of the band portion B, and a method of evaluating the solderability and flexural strength in Table (2) was identical to a method of evaluating the solderability and the flexural strength in Table (1).

TABLE 2

| Sample No. | t3 (μm) | t4 (μm) | t5 (μm) | t6 (μm) | t5/(t3 + t4)*100 | Solderability | Flexural Strength |
|---|---|---|---|---|---|---|---|
| 21 | 20 | 20 | 1 | 1 | 2.5 | ○ | ○ |
| 22 | 20 | 20 | 1 | 10 | 2.5 | ○ | ○ |
| 23 | 20 | 20 | 5 | 1 | 12.5 | ○ | ○ |
| 24 | 20 | 20 | 5 | 10 | 12.5 | ○ | ○ |
| 25* | 20 | 20 | 7 | 1 | 17.5 | ○ | X |
| 26* | 20 | 20 | 7 | 10 | 17.5 | ○ | X |
| 27 | 50 | 50 | 1 | 1 | 1 | ○ | ○ |
| 28 | 50 | 50 | 1 | 10 | 1 | ○ | ○ |
| 29 | 50 | 50 | 5 | 1 | 5 | ○ | ○ |
| 30 | 50 | 50 | 5 | 10 | 5 | ○ | ○ |
| 31* | 50 | 50 | 7 | 1 | 7 | ○ | X |
| 32* | 50 | 50 | 7 | 10 | 7 | ○ | X |
| 33 | 80 | 80 | 1 | 1 | 0.63 | ○ | ○ |
| 34 | 80 | 80 | 1 | 10 | 0.63 | ○ | ○ |
| 35 | 80 | 80 | 5 | 1 | 3.13 | ○ | ○ |
| 36 | 80 | 80 | 5 | 10 | 3.13 | ○ | ○ |
| 37* | 80 | 80 | 7 | 1 | 4.38 | ○ | X |
| 38* | 80 | 80 | 7 | 10 | 4.38 | ○ | X |
| 39 | 120 | 120 | 1 | 1 | 0.42 | ○ | ○ |
| 40 | 120 | 120 | 1 | 10 | 0.42 | ○ | ○ |
| 41 | 120 | 120 | 5 | 1 | 2.08 | ○ | ○ |
| 42 | 120 | 120 | 5 | 10 | 2.08 | ○ | ○ |
| 43* | 120 | 120 | 7 | 1 | 2.92 | ○ | X |
| 44* | 120 | 120 | 7 | 10 | 2.92 | ○ | X |
| 45 | 150 | 150 | 1 | 1 | 0.33 | ○ | ○ |
| 46 | 150 | 150 | 1 | 10 | 0.33 | ○ | ○ |
| 47 | 150 | 150 | 5 | 1 | 1.67 | ○ | ○ |
| 48 | 150 | 150 | 5 | 10 | 1.67 | ○ | ○ |

TABLE 2-continued

| Sample No. | t3 (μm) | t4 (μm) | t5 (μm) | t6 (μm) | t5/(t3 + t4)*100 | Solderability | Flexural Strength |
|---|---|---|---|---|---|---|---|
| 49* | 150 | 150 | 7 | 1 | 2.33 | ○ | X |
| 50* | 150 | 150 | 7 | 10 | 2.33 | ○ | X |

*Comparative Example

Referring to Table (2), samples No. 21 to 32 corresponded to a case in which t3+t4 were less than or equal to 100 μm. Samples No. 21 to 24 and 27 to 30 which satisfied both 0.5 μm≤t5<7 μm and 1≤t5/(t3+t4)*100<17.5 exhibited excellent flexural strength, but samples No. 25, 26, 31, and 32 which did not satisfy at least one of 0.5 μm≤t5<7 μm and 1.0≤t5/(t3+t4)*100<17.5 exhibited inferior flexural strength.

Samples No. 33 to 50 corresponded to a case in which t3+t4 was more than 100 μm. Samples No. 33 to 36, 39 to 42, and 45 to 48 which satisfied both 0.5 μm≤t5<7 μm and 0.3≤t5/(t3+t4)*100<4.38 exhibited excellent flexural strength. Samples No. 37 38, 43, 44, 49, and 50 which did not satisfy at least one of 0.5 μm≤t5<7 μm and 0.3≤t5/(t3+t4) *100<4.38 exhibited inferior flexural strength.

As described above, according to an exemplary embodiment, a thickness of a nickel (Ni) plating layer of an external electrode may be adjusted to secure solderability and improve flexural strength.

While exemplary embodiments have been shown and described above, it will be apparent to those skilled in the art that modifications and variations could be made without departing from the scope of the present invention as defined by the appended claims.

What is claimed is:

1. A ceramic electronic component comprising:
a body including dielectric layers and a plurality of internal electrodes disposed to face each other with the dielectric layers interposed therebetween in a stacking direction, the body having first and second surfaces disposed to oppose each other in the stacking direction, third and fourth surfaces connected to the first and second surfaces and disposed to oppose each other, and fifth and sixth surfaces connected to the first to fourth surfaces and disposed to oppose each other; and
an external electrode including a connection portion disposed on at least one selected from the group of the third and fourth surfaces and a band portion extending from the connection portion to portions of the first and second surfaces,
wherein the external electrode includes an electrode layer electrically connected to the internal electrode and disposed in the band portion on the first and second surfaces, a conductive resin layer disposed on the electrode layer and in the band portion disposed on the first and second surfaces, a nickel (Ni) plating layer disposed on the conductive resin layer, and a tin (Sn) plating layer disposed on the Ni plating layer, and
$0<t1/t2<0.6$ or $1.0<t1/t2<7.0$, where t1 is an extent of the Ni plating layer in direct contact with the body in the band portion and t2 is an extent of the Sn plating layer in direct contact with the body in the band portion, and t1 is within a range from 0.5 micrometer to 7 micrometers, and
wherein each of the internal electrodes has a thickness less than 1 micrometer, each of the dielectric layers has a thickness less than 2.8 micrometers, and td>2*te, where te is the thickness of each of the internal electrodes and td is the thickness of each of the dielectric layers.

2. The ceramic electronic component of claim 1, wherein t2 is within a range from 0.5 micrometer to 12 micrometers.

3. The ceramic electronic component of claim 1, wherein the electrode layer includes a glass and at least one conductive metal selected from the group consisting of copper (Cu), silver (Ag), nickel (Ni), and alloys thereof.

4. The ceramic electronic component of claim 1, wherein the conductive resin layer includes a base resin and at least one conductive metal selected from the group consisting of copper (Cu), silver (Ag), nickel (Ni), and alloys thereof.

5. A ceramic electronic component comprising:
a body including dielectric layers and a plurality of internal electrodes disposed to face each other with the dielectric layers interposed therebetween in a stacking direction, the body having first and second surfaces disposed to oppose each other in the stacking direction, third and fourth surfaces connected to the first and second surfaces and disposed to oppose each other, and fifth and sixth surfaces connected to the first to fourth surfaces and disposed to oppose each other; and
an external electrode including a connection portion disposed on at least one selected from the group of the third and fourth surfaces and a band portion extending from the connection portion to portions of the first and second surfaces,
wherein the external electrode includes an electrode layer connected to the internal electrode and disposed in the band portion on the first and second surfaces, a conductive resin layer disposed on the electrode layer and in the band portion disposed on the first and second surfaces, a nickel (Ni) plating layer disposed on the conductive resin layer, and a tin (Sn) plating layer disposed on the Ni plating layer, and
$4 < t5/(t3+t4)*100 < 17.5$, where t3 is an electrode layer thickness of the band portion, t4 is a conductive resin layer thickness of the band portion, and t5 is a nickel (Ni) plating layer thickness of the band portion, and t3+t4 is less than or equal to 100 micrometers.

6. The ceramic electronic component of claim 5, wherein a thickness of the tin (Sn) plating layer is within a range from 0.5 micrometer to 12 micrometers.

7. The ceramic electronic component of claim 5, wherein each of the internal electrodes has a thickness less than 1 micrometer, and each of the dielectric layers has a thickness less than 2.8 micrometers.

8. The ceramic electronic component of claim 5, wherein td>2*te, where te is a thickness of each of the internal electrodes and td is a thickness of each of the dielectric layers.

9. The ceramic electronic component of claim 5, wherein the electrode layer includes a glass and at least one conductive metal selected from the group consisting of copper (Cu), silver (Ag), nickel (Ni), and alloys thereof.

10. The ceramic electronic component of claim 5, wherein the conductive resin layer includes a base resin and at least one conductive metal selected from the group consisting of copper (Cu), silver (Ag), nickel (Ni), and alloys thereof.

11. A ceramic electronic component comprising:
a body including dielectric layers and a plurality of internal electrodes disposed to face each other with the dielectric layers interposed therebetween in a stacking direction, the body having first and second surfaces disposed to oppose each other in the stacking direction, third and fourth surfaces connected to the first and second surfaces and disposed to oppose each other, and fifth and sixth surfaces connected to the first to fourth surfaces and disposed to oppose each other; and
an external electrode including a connection portion disposed on at least one selected from the group of the third and fourth surfaces and a band portion extending from the connection portion to portions of the first and second surfaces,
wherein the external electrode includes an electrode layer connected to the internal electrode, a conductive resin layer disposed on the electrode layer and in the band portion disposed on the first and second surfaces, a nickel (Ni) plating layer disposed on the conductive resin layer, and a tin (Sn) plating layer disposed on the Ni plating layer, and
$0.3 \leq t5/(t3+t4)*100 < 4.38$, where t3 is an electrode layer thickness of the band portion, t4 is a conductive resin layer thickness of the band portion, and t5 is a nickel (Ni) plating layer thickness of the band portion, and t3+t4 is greater than 100 micrometers.

12. The ceramic electronic component of claim 11, wherein a thickness of the tin (Sn) plating layer is within a range from 0.5 micrometer to 12 micrometers.

13. The ceramic electronic component of claim 11, wherein each of the internal electrodes has a thickness less than 1 micrometer, and each of the dielectric layers has a thickness less than 2.8 micrometers.

14. The ceramic electronic component of claim 11, wherein td>2*te, where te is a thickness of each of the internal electrodes and td is a thickness of each of the dielectric layers.

15. The ceramic electronic component of claim 11, wherein the electrode layer includes a glass and at least one conductive metal selected from the group consisting of copper (Cu), silver (Ag), nickel (Ni), and alloys thereof.

* * * * *